UNITED STATES PATENT OFFICE.

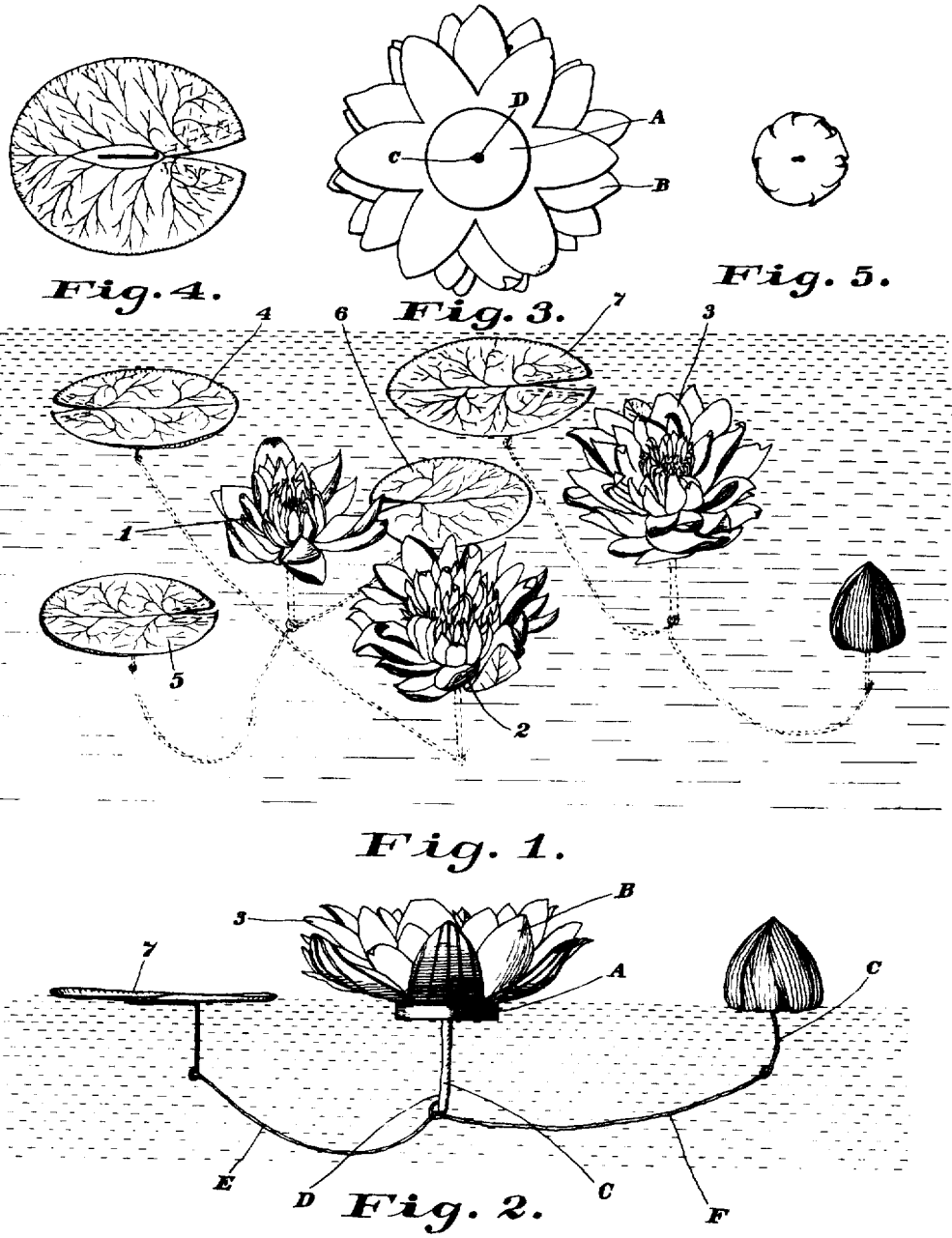

TOMOSUKE OSHIMA, OF NEW YORK, N. Y.

ARTIFICIAL FLOWER.

1,188,198.   Specification of Letters Patent.   Patented June 20, 1916.

Application filed October 30, 1915. Serial No. 58,758.

*To all whom it may concern:*

Be it known that I, TOMOSUKE OSHIMA, a subject of the Mikado of Japan, and a resident of the borough of Manhattan, city of New York, county and State of New York, have invented certain new and useful Improvements in Artificial Flowers, of which the following is a specification.

The invention relates to the manufacture of artificial flowers. According to the present invention the flowers are constructed so as to float on water. The flower which is frequently seen on water is the pond-lily and the particular cluster which is illustrated comprises pond-lilies which are in bloom or in bud and pond-lily leaves.

In order that the flowers and buds as well as the leaves may have stems, there are provided depending members and also long flexible connectors which cause the parts thus connected to have the appearance of a cluster when placed in the water.

As showing certain specific embodiments of the invention reference is made to the drawing forming a part of this specification and in which drawing,—

Figure 1 shows in perspective two clusters as they appear when floating on the water. Fig. 2 is a vertical view of the cluster shown at the right of Fig. 1. In Fig. 2 a portion of the leaf and a portion of the bud are shown in section. Figs. 3, 4 and 5 are views of the under side of the flower, leaf and bud respectively.

A full blown flower and a partially blown flower will hereinafter be referred to as the flower or flower member and in fact a bud may be considered to be a flower member.

1, 2 and 3 represent flower members and the flower members 1 and 2 have the same general construction as the flower member designated as 3, in that each have a buoyant support A, which is preferably a circular piece of cork. In each of these flower members the part B resembles the bloom of the flower and the part C the depending member or stem. This depending member is in fact a wire that secures the bloom B to the buoyant member A. This wire is preferably covered with a green fabric casing D which gives to the wire the appearance of a stem of a flower. This depending wire has a further function, however, that of serving as a stabilizer whereby the flower will be held in the proper position when in the water and from an inspection of Fig. 1 it will be observed that substantially the whole of the flower is maintained above the level of the water. The lower end of the stabilizer or depending wire C is formed into an eye and there is connected to it the flexible connectors E and F, which may be pieces of green yarn.

The leaves are designated by the reference characters 4, 5, 6 and 7 and each of these leaves has a saucer-shaped body member and a depending wire that serves also as a stem and as a stabilizer. It will be noted that the major portion—the body portion—of this saucer-shaped leaf is flat or extends horizontally and it has the upstanding upturned edges whereby when the leaf is placed on the water sufficient water will be displaced for the leaf to float on the surface of the water. The stabilizer is preferably secured to the underside of the body member and the specific gravity of the combined body member and stabilizer is greater than the water so that were it not for the water being displaced due to the upturned edges of the leaf the latter would sink.

The lower end of the stabilizer on the leaf is formed in the shape of an eye so as to receive one end of the yarn. The bud as will be observed from an inspection of Fig. 2 has a substantially horizontally extending bottom or body with upstanding upturned imitation sepals that provide a hollow bud which is of such shape that the bud will float when on the water. This bud also has secured to the underside thereof a depending wire that performs both the function of a stem and of a stabilizer. The lower end of this stem is also provided with an eye so as to receive an end of one of the portions of the yarn.

In the practical manufacture of the cluster shown applicant has utilized fabric as the foundation of the leaf and this fabric is covered with a wax in order to render it more or less waterproof. As to the flowers and buds, which are buoyant these are generally made of a very thin paper and in order to render the paper waterproof to a certain extent it is coated or impregnated with wax.

The improvements herein set forth are not limited to the precise construction and arrangement shown and described, for they may be embodied in various forms and modifications without departing from the spirit and scope of the invention.

What I claim is:

1. An artificial bud or flower member having a substantially-horizontally extending body member from which there extends upwardly imitation sepals so as to form a hollow construction whereby the bud or flower member will float, said bud or flower member having projecting from the underside thereof a member providing a stem.

2. An artificial cluster comprising a flower member which has a buoyant support, a leaf which has a substantially flat body member with upturned edges and a flexible connector for securing the flower member to the leaf.

3. An artificial cluster comprising a flower member which has a buoyant support, a leaf which has a substantially flat body with upturned edges and a flexible connector for securing the flower member to the leaf, said flexible connector being secured to the depending ends of stabilizers which constitute parts of the flower member and the leaf respectively and which respectively provide the stem portion of the flower member and the leaf.

4. A cluster comprising an artificial buoyant flower member, one or more artificial buoyant leaves and a flexible means connecting the leaf or leaves to the flower member.

This specification signed and witnessed this 29th day of October, A. D. 1915.

TOMOSUKE OSHIMA.

Signed in the presence of—
EDWIN A. PACKARD,
G. McGRANN.

What I claim is:

1. An artificial bud or flower member having a substantially-horizontally extending body member from which there extends upwardly imitation sepals so as to form a hollow construction whereby the bud or flower member will float, said bud or flower member having projecting from the underside thereof a member providing a stem.

2. An artificial cluster comprising a flower member which has a buoyant support, a leaf which has a substantially flat body member with upturned edges and a flexible connector for securing the flower member to the leaf.

3. An artificial cluster comprising a flower member which has a buoyant support, a leaf which has a substantially flat body with upturned edges and a flexible connector for securing the flower member to the leaf, said flexible connector being secured to the depending ends of stabilizers which constitute parts of the flower member and the leaf respectively and which respectively provide the stem portion of the flower member and the leaf.

4. A cluster comprising an artificial buoyant flower member, one or more artificial buoyant leaves and a flexible means connecting the leaf or leaves to the flower member.

This specification signed and witnessed this 29th day of October, A. D. 1915.

TOMOSUKE OSHIMA.

Signed in the presence of—
EDWIN A. PACKARD,
G. McGRANN.

---

Correction in Letters Patent No. 1,188,198.

It is hereby certified that in Letters Patent No. 1,188,198, granted June 20, 1916, upon the application of Tomosuke Oshima, of New York, N. Y., for an improvement in "Artificial Flowers," an error appears in the printed specification requiring correction as follows: Page 2, line 29, claim 4, strike out the article "a"; and that the said Letters Patent should be read with this correction therein that the same may conform to the record of the case in the Patent Office.

Signed and sealed this 5th day of September, A. D., 1916.

[SEAL.]

F. W. H. CLAY,
*Acting Commissioner of Patents.*

Cl. 41—14.

Correction in Letters Patent No. 1,188,198.

It is hereby certified that in Letters Patent No. 1,188,198, granted June 20, 1916, upon the application of Tomosuke Oshima, of New York, N. Y., for an improvement in "Artificial Flowers," an error appears in the printed specification requiring correction as follows: Page 2, line 29, claim 4, strike out the article "a"; and that the said Letters Patent should be read with this correction therein that the same may conform to the record of the case in the Patent Office.

Signed and sealed this 5th day of September, A. D., 1916.

[SEAL.]

F. W. H. CLAY,
*Acting Commissioner of Patents.*

Cl. 41—14.